UNITED STATES PATENT OFFICE.

TEOFRON BOBERG, OF LONDON, ENGLAND, ASSIGNOR TO TECHNO-CHEMICAL LABORATORIES LIMITED, OF LONDON, ENGLAND.

CATALYTIC MATERIAL AND PROCESS OF PRODUCING THE SAME.

1,093,377.

No Drawing.

Specification of Letters Patent. Patented Apr. 14, 1914.

Application filed March 3, 1913. Serial No. 751,698.

*To all whom it may concern:*

Be it known that I, TEOFRON BOBERG, a subject of the King of Sweden, of Fairlawn, Clarence Road, Clapham Park, London, S. W., England, have invented certain new and useful Improvements in Catalytic Material and Processes of Producing the Same, of which the following is a specification.

This invention relates to improvements in catalytic operations such as the hydrogenation of unsaturated fatty acids and their glycerids and has for its object to provide improved methods for the preparation and treatment of catalysts therefor and to provide improved catalysts.

The invention consists in preparing the catalyst by reduction with hydrogen of a metallic compound such as ignited nickel carbonate, under such conditions that as far as possible the resulting catalyst is or may be a complex compound of one or more suboxids of the metal.

This invention further consists in collecting the reduced product in an indifferent liquid such as water, separating it therefrom and drying it or allowing it to dry or in otherwise permitting slow oxidation and preparing it for use when needed by exposing it to hydrogen for some time at a relatively low temperature say at 180° C.

This invention also consists in the improvements in the carrying out of catalytic processes hereinafter indicated.

I have observed that the product of reduction of ignited nickel carbonate by means of hydrogen has a greater activity the lower the temperature of reduction, the activity of the catalyst depending, as I have ascertained upon the metal which is present in the material being at least in part a suboxid.

One method of preparing a catalytic material according to this invention consists in introducing ignited nickel carbonate (the latter having been prepared so as to free it as far as possible from deleterious impurities) continuously into a rotary inclined tube suitably heated through the whole or part of its length so that the material passes through the apparatus in a slow stream while hydrogen is passed through the heated tube in the opposite direction.

By adjusting the flow of the material and the temperature to which the substance is heated, the reduction can so be carried out as to give a product in which the metal is contained wholly or mainly as suboxid. The preferred range of temperature is from 230° to 270° C., the material being heated for a longer period the lower the temperature employed. Unnecessarily protracted heating should be avoided as leading to a more complete reduction with loss of activity in the product.

The product may be collected for immediate use in the medium in which it is to be used, e. g. oil, but if not required at once slow oxidation in the atmosphere can be allowed, provided local overheating is prevented (which leads to excessive oxidation) and the material can then be kept without special precautions against oxidation and restored to full activity when required as hereinafter indicated. For instance the material may be collected in water and then filtered therefrom and allowed to dry in the air or may be collected in an atmosphere of hydrogen, which is then slowly replaced by oxygen or air.

In order to prepare it for use the material only requires to be heated for say one to two hours at about 180° C. in an atmosphere of hydrogen or the catalyst may be treated with hydrogen when in suspension in a suitable liquid. When the catalyst is used for hardening fats or oils or in similar cases no special treatment of this kind is necessary as the catalyst acquires its full activity in the early stages of the process.

The catalyst may be prepared by reducing to nickel as completely as possible one of the oxids of nickel and suitably oxidizing this product with air or oxygen diluted with an inert gas; the proportion of oxygen being regulated to avoid local overheating. This oxidizing action can be carried out at between 300° and 600° C.

I have made experiments with various products of reduction and have obtained *inter alia* the following results:—The product of reduction of such a composition that an ultimate analysis gives a proportion of nickel to oxygen corresponding to an imaginary formula $Ni_{9.3}O$, i. e. but little suboxid, produced in a certain unit of time hardening of a liquid fat up to a melting point of 40° centigrade, whereas, a product corresponding to an imaginary formula $Ni_{2.65}O$ gave in the same time and for the same material hardening corresponding to a melting point of 58° centigrade. It appeared, however, that with a lesser proportion of nickel in the product, i. e. a composition that apparently indicated the presence of higher oxids, the same was less active, while, at the same time, compounds containing even higher proportions of metallic nickel than that first specified above, viz. $Ni_{9.3}O$ were still less active than the latter.

It will be understood that the improved catalytic material above described may be supported on an inert support, for example, by depositing a metallic compound on to an inert support when the latter is in a finely divided condition and before the reduction is carried out, and it will also be understood that the improved catalytic materials referred to may be employed in any of the various methods previously proposed for carrying out catalytic reactions, for example, that process in which the material to be treated is admixed with the catalyst and the mixture exposed as a spray or in a similar condition of minute subdivision to the action of hydrogen or other reacting gases.

I claim:

1. The method of preparing a catalyst consisting in subjecting a high oxid of nickel to the reducing action of hydrogen to produce a compound in which the nickel is contained mainly as one or more sub-oxids.

2. The method of preparing a catalyst consisting in subjecting a high oxid of nickel, at a temperature of approximately 230° C. to 270° C., to the reducing action of hydrogen to produce a compound in which the nickel is contained mainly as one or more sub-oxids.

3. The method of preparing a catalyst consisting in subjecting a high oxid of a metal to the reducing action of hydrogen to produce a compound in which the metal is contained mainly as one or more sub-oxids, collecting the product in an indifferent liquid, and separating the product from the liquid and drying it.

4. The method of preparing a catalyst consisting in subjecting a high oxid of a metal to the reducing action of hydrogen to produce a compound in which the metal is contained mainly as one or more sub-oxids, and preparing it for use by heating at about 180° C. in an atmosphere of hydrogen.

5. The method of preparing a catalyst consisting in subjecting a high oxid of nickel to the reducing action of hydrogen to produce a compound in which the nickel is contained mainly as one or more sub-oxids, collecting the product and preparing it for use by heating in an atmosphere of hydrogen at a relatively low temperature.

6. An active catalyst for the hydrogenation of unsaturated fatty acids and their glycerids, containing a sub-oxid of nickel corresponding approximately to the formula $Ni_{2.65}O$.

7. An active catalyst for the hydrogenation of unsaturated fatty acids and their glycerids, containing a sub-oxid of nickel produced by treating a high oxid of nickel at a temperature of approximately 230° C. to 270° C. to the reducing action of hydrogen.

In testimony whereof I have signed my name to this specification in the presence of two subscribing witnesses.

TEOFRON BOBERG.

Witnesses:
BERTRAM H. MATTHEWS,
J. W. PATCHING.